July 23, 1940.  E. G. BODEN  2,208,863
BEARING MOUNTING
Filed Aug. 27, 1938
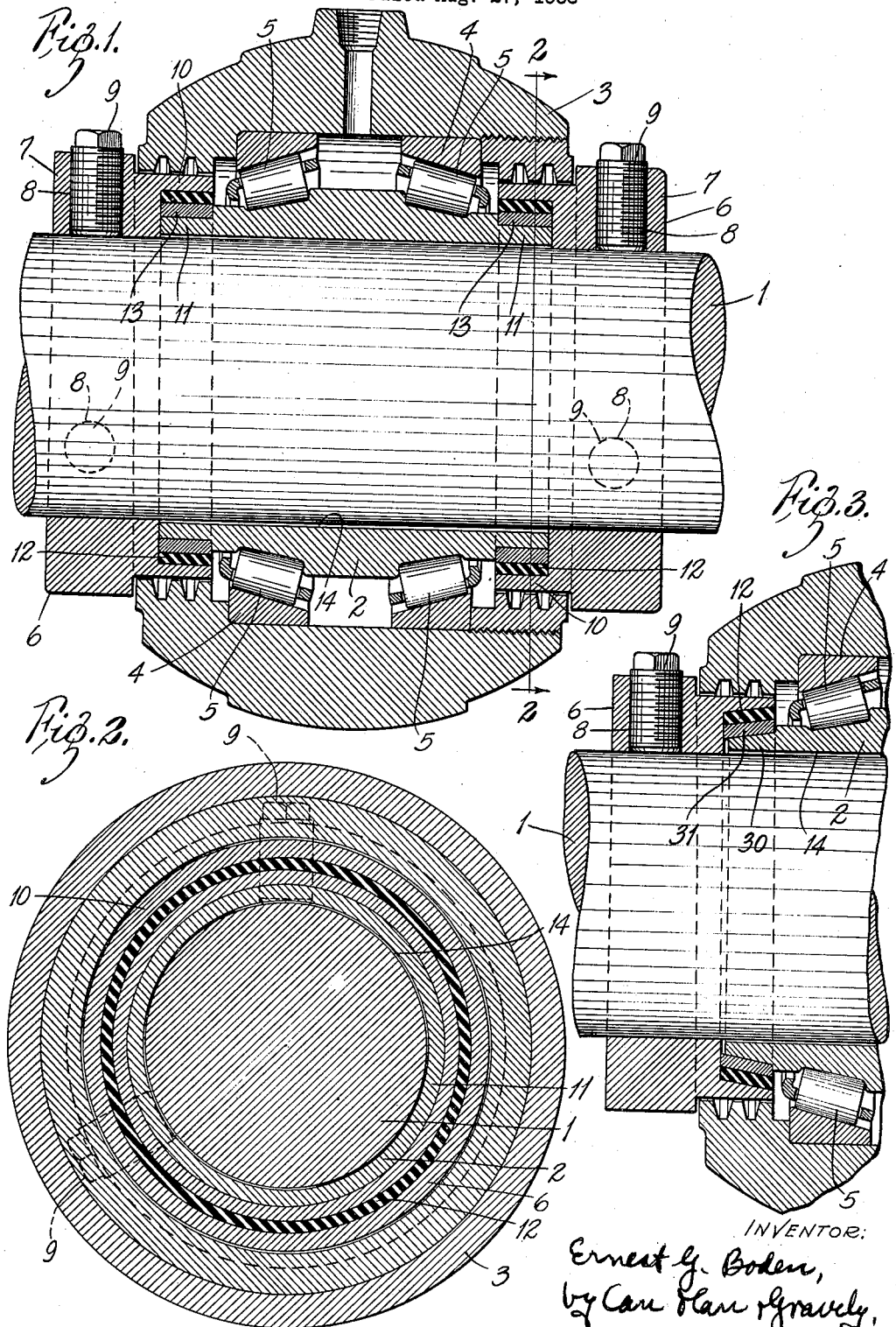
INVENTOR:
Ernest G. Boden,
by Carr Hau & Gravely
HIS ATTORNEYS.

Patented July 23, 1940

2,208,863

UNITED STATES PATENT OFFICE 2,208,863

BEARING MOUNTING

Ernest G. Boden, Canton, Ohio, assignor to The Timken Roller Bearing Company, Canton, Ohio, a corporation of Ohio Application August 27, 1938, Serial No. 227,081

3 Claims. (Cl. 287—52)

My invention relates to the mounting of bearings, particularly to the mounting of roller bearings in such devices as pillow blocks. It is common practice to secure the inner bearing member of such devices in position by means of a locking collar secured to the shaft by a set screw and overlapping a portion of said bearing member. It is quite difficult to prevent the set screws of such locking collars from loosening and thereby causing the bearing member to become loose on the shaft. The principal object of the present invention is to provide a bearing mounting in which the locking collar and hence the inner bearing member remain firmly secured to the shaft.

The invention consists principally in a locking collar for such constructions, wherein sufficient flexibility is provided in said collar at its point of engagement with said bearing member to accommodate flexing of the shaft and other misalining movement of the bearing member. The invention further consists in providing a resilient sleeve or insert in the portion of said locking collar that overlaps and engages the bearing member. The invention further consists in the bearing mounting and in the parts and combinations and arrangements of parts hereinafter described and claimed.

In the accompanying drawing:

Fig. 1 is a longitudinal sectional view of a pillow block having a bearing mounting embodying my invention, Fig. 2 is a cross-sectional view on the line 2—2 in Fig. 1; and Fig. 3 is a partial longitudinal sectional view of a modification.

In the drawing is illustrated a pillow block including a shaft 1, a double row cone 2 or inner bearing member thereon, a housing 3, bearing cups 4 in said housing, taper bearing rollers 5 between the cups and the respective raceways of said bearing cone and locking collars for said bearing cone indicated generally by 6.

Each locking collar 6 comprises an annular body portion 7 provided with threaded holes 8 in which are mounted set screws 9 that engage the shaft 1 and a projecting sleeve portion 10 that extends into the housing 3 and overlaps a cylindrical portion 11 on the end of said bearing cone 2. Mounted in the end portion of each sleeve 10 is a ring 12 of rubber or other resilient material in which is a ring 13 or sleeve of metal, the rubber ring 12 being preferably vulcanized both to the inside of said projecting sleeve 10 of said collar and to the outside of said metal sleeve 13. Each metal sleeve 13 fits closely on a projecting end portion 11 of said bearing cone.

Preferably the bore 14 of said bearing cone 2 is sufficiently larger than the outside diameter of the shaft 1 to provide clearance between the two members, the bearing cone being supported solely in said metal sleeve 13 of said collars 6.

In the modified construction shown in Fig. 3, the projecting ends 30 of the bearing cone are tapered and the metal sleeve 31 has a conical bore to fit thereon. In this construction the cone is shown as fitting on the shaft in the usual way.

The rubber insert 12 in said collar accommodates any slight movement or misalinement, due to flexing of the shaft or other causes and thus largely relieves the set screws of strain that would cause them to loosen, resulting in loosening of the bearing member.

Obviously, numerous changes may be made without departing from the invention and I do not wish to be limited to the precise construction shown.

What I claim is:

1. A roller bearing mounting or the like comprising a shaft, an annular member thereon having a projecting end portion and a locking collar secured to said shaft, said collar having a portion overlapping said end portion of said annular member, a resilient ring in said overlapping portion of said collar, and a metal ring within said resilient ring and engaging said end portion of said annular member.

2. A roller bearing mounting or the like comprising a shaft, an annular member thereon having a tapered end portion and a locking collar secured to said shaft, said collar having a portion overlapping said end portion of said annular member, a resilient ring in said overlapping portion of said collar, and an internally conical metal ring within said resilient ring fitting said tapered end portion of said annular member.

3. A roller bearing mounting or the like comprising a shaft, an annular member thereon having a projecting end portion and a locking collar secured to said shaft, said collar having a portion overlapping said end portion of said annular member, a rubber ring in said overlapped portion of said collar, and a metal ring within said resilient ring and engaging said end portion of said annular member, said rubber ring being vulcanized to said collar and to said metal ring.

ERNEST G. BODEN.